Figure 1:
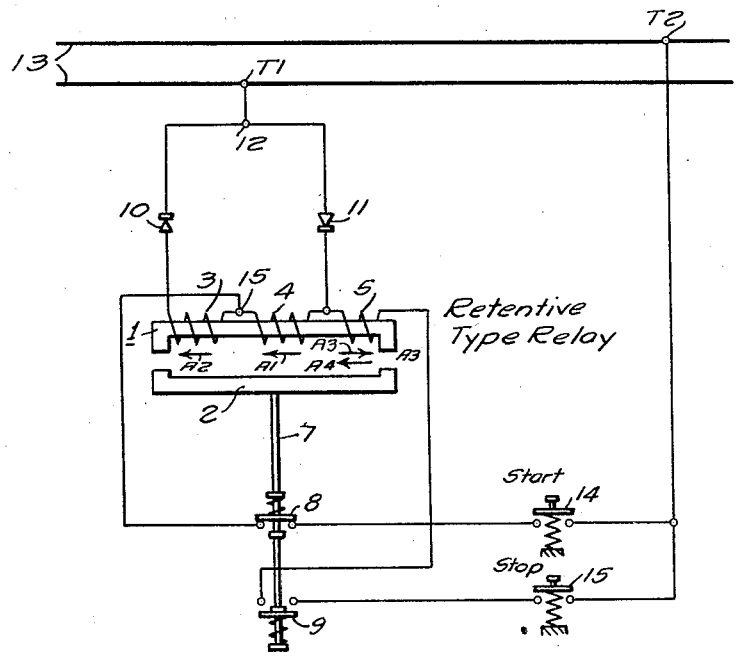

Feb. 17, 1948.   O. L. TAYLOR   2,436,339
ELECTROMAGNETIC RELAY
Filed Feb. 28, 1947

WITNESSES:
E.A. M?Closkey.
Nw. L. Joonne

INVENTOR
Owen L. Taylor.
BY
C. M. Avery
ATTORNEY

Patented Feb. 17, 1948

2,436,339

UNITED STATES PATENT OFFICE 2,436,339

ELECTROMAGNETIC RELAY

Owen L. Taylor, Wilkinsburg, Pa., assignor to Westinghouse Electric Corporation, East Pittsburgh, Pa., a corporation of Pennsylvania Application February 28, 1947, Serial No. 731,468

2 Claims. (Cl. 175—335)

My invention relates to electromagnetic contactors and the like relay-type devices for operation by alternating current, which are equipped with a magnetic system of the retentive type. In such relays, the magnetic circuit, comprising a stationary field structure equipped with coils and a movable armature that is biased away from the stationary structure, contains a magnetic material of relatively high remanence so that the armature is held sealed against the field structure merely by virtue of the remanent magnetism once the magnetic circuit has been sufficiently magnetized to pick up and hold the armature.

In known relays, having a retentive magnet system of the type referred to, the energizing coils of the field structure are excited by alternating current which is interrupted by an interlock contact controlled by the armature, immediately before the armature has reached the closed position. If, at the time of the interruption, the alternating excitation of the coils is at a point of its cycle unsuitable for furnishing the magnetization and remanence necessary to hold the armature sealed, the relay drops out again and may repeat this performance until the interruption occurs at the proper moment. Consequently, these relays have the tendency to flutter, and it may happen that the remanent magnetization, though sufficient to seal the armature, does not have a sufficient magnitude to secure a continued holding of the armature for an appreciable length of time or when the relay is exposed to vibration.

It is, therefore, the general object of the present invention to provide an alternating-current relay of the retentive type that secures a proper sealing-in and safe holding performance, without showing fluttering tendencies during the pickup operation.

In the copending application Serial No. 611,412, filed August 18, 1945, by George C. Armstrong and Owen L. Taylor for Electric control apparatus, assigned to the assignee of the present application, an improved alternating-current relay of the retentive type is disclosed which avoids the above-mentioned drawbacks of the known devices by providing the relay field structure with two coils that are series-connected in a closed circuit with two valve or rectifier means, and this closed circuit is connected in series with a normally-closed interlock contact across the alternating-current terminals of the relay so that, during the pickup interval, the two coils are alternately excited by half-wave rectified current with the result that, due to the time lag in the magnetic circuit, a continuous unidirectional magnetization of the field structure and armature is effective.

The present invention relates more specifically to relays of the last-mentioned kind and aims at improvements which permit a reduction in the electric material needed for making the device, while also affording an increased reliability of operation over a larger range of electric potential values.

Another object, in conjunction with the one just mentioned, is to improve relays of the last-mentioned kind in such a manner as to render the use of rectifier or valve means more economical, especially with reference to relays of small size, i. e. under conditions where an improved economy as regards the parts that make up the electric relay circuit is of essential influence on the cost of the whole relay equipment.

In accordance with my invention, I provide an alternating-current relay, that has a retentive magnetic circuit equipped with two coils to be alternately excited through valve or rectifier means, with a third coil that is connected, on the one hand, between the rectifier and coil circuit and, on the other hand, to one of the alternating-current terminals. This third coil is traversed by current when the magnetic circuit is to be de-energized in order to release the armature by eliminating the armature-holding remanent magnetism. The third coil is so arranged that it renders unnecessary the addition of an auxiliary resistor or the like impedance for reducing the excitation to the low value required for demagnetizing the magnetic circuit. According to a preferred feature of the invention, the third coil is series-connected with the other two coils so that the demagnetizing performance is effected by the third coil in cooperation with the two other coils. This leads to an especially economical design.

Figure 2:
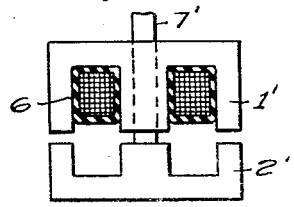

The invention will be more fully understood from the following description of the embodiment illustrated in the drawing, in which:

Figure 1 shows a circuit diagram of the electromagnetic relay and includes a schematical representation of the relay magnet and contact structure, while Fig. 2 shows a more realistic illustration of the field magnet and armature structure of the same device.

According to Figure 1, the relay has a magnetic circuit composed essentially of a stationary field structure 1 and a movable armature 2. The armature is biased away from the structure 1 by its gravity and is moved into sealing contact with the structure 1 when the magnetic circuit is sufficiently magnetized. Three coils, 3, 4 and 5, are disposed on the structure 1. Coils 3 and 4 operate cumulatively in order to provide the flux necessary for attracting and sealing the armature 2. The magnetic circuit contains a retentive material so that the remanence of the circuit is sufficient to hold the armature 2 in sealed-in position once the proper magnetization has been applied. In order to obtain the necessary remanence, one or both of the elements 1 and 2 may wholly or partially consist of magnet steel of the kind used for permanent magnets. For instance, some of the laminations of the field structure 1 or of the armature 2 may consist of such remanent material, while the other laminations consist of the customary dynamo or silicon iron. The particular design of a remanent magnetic circuit is not a feature of my invention proper. It should be noted, however, that while the field structure and armature are shown in Figure 1 to be U-shaped, this design has been chosen mainly for the sake of convenient illustration. In reality, I prefer using a substantially E-shaped field structure and a similarly shaped armature, as shown in Fig. 2 at 1' and 2', respectively. The coils are preferably all located on the center leg of the E-shaped field structure in the winding space denoted by 6 in Fig. 2.

Connected to the armature is a guide structure 7 (Fig. 1), or 7' (Fig. 2), which controls a normally closed interlock contact 8 and a normally open interlock contact 9 (Fig. 1). In addition to these interlock contacts, the relay is equipped with a main contact assembly to be connected with the circuit to be controlled by the relay. This main contact assembly is not illustrated in the drawing, because its design is of no relevance to my invention and may have various known forms of construction.

The coils 3 and 4 are series-connected with two valve means 10 and 11 so as to form a closed circuit together therewith. The valve means 10 and 11 consist preferably of dry or junction-type rectifier elements, such as copper-oxide rectifiers. The midpoint 12 of the closed circuit, located between the two valve means 10 and 11, is connected with terminal T1 for attachment to an alternating-current line 13. The other terminal T2 of the relay is connected, through a normally-open start contact 14 and in series with the above-mentioned normally closed interlock contact 8, to the closed coil circuit at a point 15 located between the two coils 3 and 4. The coil 5 has its remaining end connected, in series with the normally open interlock contact 9 and in series with a normally open stop contact 15, to the terminal T2.

When the start contact is temporarily closed, a circuit is completed which extends from terminal T1 in parallel through the valves 10 and 11 and coils 3 and 4, respectively, thence through the interlock contact 8 and the start contact 14 to terminal T2. During one half-wave period of the alternating current then flowing between terminals T1 and T2, this current passes through the valve 11 and the coil 4 and causes this coil to induce a flux in a given direction, for instance as indicated by the arrow A1. During the next half-cycle period, the coil 4 is unexcited and the current passes through the valve 10 and the coil 3, exciting the latter to produce a flux in the direction of arrow A2 which is identical with the direction of arrow A1. Due to the relatively large time constant of the magnetic circuit, the two alternating fluxes produce a virtually continuous and constant magnetization above the value necessary for moving the armature from the illustrated position into sealing engagement with the field structure 1. As a result, the contact 8 is opened and the contact 9 closed. Contact 8 interrupts the above-mentioned circuit so that coils 3 and 4 become deenergized. Thereafter, the armature is held sealed due to remanent magnetism. Since the pickup magnetization of the field structure remains above the minimum value necessary for attracting the armature, the sealing performance is independent of the moment at which the interruption occurs relative to the cycle period of the alternating current. Consequently, a safe sealing and holding performance is secured under any operating conditions, and there is no tendency of the relay to flutter.

During the above-mentioned pickup performance of the relay, the moment of opening of contact 8 is not critical. Even if this contact opens before the moment of armature sealing, the magnetic flux is maintained by the inductive reaction current that is permitted to flow for some additional time through the closed circuit 4—3—10—11—4. This relative independence of proper sealing operation from the time point of contact opening is an essential advantage of the relay as it takes the relay out of the class of high precision instruments and permits making it by mass production methods on ordinary relay factory assembly lines. For instance, while in the above-mentioned known relays with a fluttering interlock contact the contact gap must be held below a maximum of about 0.010 inch, relays according to the invention can operate with a contact gap of about $\frac{1}{16}$ inch. Contact 9 can close at any time after the armature leaves its open position and hence, likewise, does not involve high accuracy requirements.

When the relay is sealed in, the closing of stop contact 15 completes a circuit between terminals T1 and T2 which extends through the two valves 10, 11, the two coils 3, 4, and also through the coil 5. The two coils 3 and 4 now receive unidirectional excitation in alternate half-cycle periods, but the excitation of these two coils is reduced due to the fact that they are now series-connected in the energizing circuit. More specifically, during the half-cycle periods in which terminal T1 is positive with respect to terminal T2, the current flows in the circuit T1—12—11—5—9—15—T2. Hence, only the coil 5 is excited during this cycle period. The coil 5 is so wound that the flux caused by this excitation in the structure 1 is in opposition to the pickup flux, and hence corresponds to the direction indicated by the arrow A3. During the other half-cycle periods, terminal T1 then being negative relative to terminal T2, the current flows in the circuit T1—12—10—3—4—5—9—15—T2. The flux resulting from this current flow in all three coils is of the same direction as the pickup flux, that is, the flux direction appertaining to coil 5 with respect to the latter half-cycle period is represented by the arrow A4.

The ampere turns effective during the two respective half-cycle periods depend upon the impedance rating and number of turns of the respective three coils. Preferably, the three coils have all the same conductivity, and the same mean length of turns or substantially the same number of turns. Under these conditions, the resulting ampere turns of the coil 5 during the first-mentioned half-cycle period (see arrow A3) are equal and opposite in direction to the resultant ampere turns of all three coils that are effective during the other half-cycle period. Consequently, when the stop contact 15 is closed, the flux induced in the magnetic circuit is alternating and is the same as if a straight alternating-current voltage had been impressed across one of the three coils. The effect of such alternating magnetization is to reduce the remanent magnetism during a sequence of current cycles, with the result that the remanence drops below the value necessary for holding the armature, hence, the armature follows its bias and drops out, thereby opening the contact 9 and interrupting the circuit of coil 5.

It will be recognized that, in the above-described embodiment of the invention, all three coils cooperate during the dropping-out performance with the result of producing a resultant alternating flux of reduced magnitude as compared with the unidirectional flux applied by two of the coils during the pickup performance. In this manner, the safe operation is secured without the necessity of using external resistors or the like impedances, or if such additional impedances are applied, their rating and size can be considerably reduced by virtue of the invention.

It will be understood by those skilled in the art that relays according to the invention can be modified and altered as regards their details, without departing from the essence of the invention and within the scope of the essential features of the invention as set forth in the claims annexed hereto.

I claim as my invention:

1. An electromagnetic device, comprising a retentive magnetic circuit having a field structure and an armature biased away from said structure and being adapted for holding said armature picked up against the armature bias, three coils disposed on said structure, two of said coils being series-connected with each other and disposed in cumulative relation to each other, two valve means series-connected to each other across said two coils to form a closed circuit together therewith and having the same polarity of connection relative to said closed circuit, two terminals for supplying alternating current, a normally open start contact, a normally closed interlock contact and a normally open interlock contact both controlled by said armature, one of said two terminals being connected to a point of said closed circuit between said two valve means and said other terminal being connected to a point of said closed circuit between said two coils, said normally closed interlock contact and said start contact being disposed in series with said closed circuit between said two terminals so that, when said start contact is closed, said two coils are alternately excited through said respective valve means to temporarily produce pickup fluxes of the same directions in said magnetic circuit, a normally open stop contact, said third coil having one end connected to said closed circuit at a point between one of said valve means and one of said two coils, the other end of said third coil being connected in series with said normally open interlock contact and in series with said stop contact to said other terminal, and said third coil being wound to produce flux in opposition to that of said other coils when said stop contact is closed and said third coil is traversed by current flowing through the arc valve adjacent to said third coil so that, when said armature is in picked-up position, said magnetic circuit is demagnetized by current flowing through said third coil when said stop contact is closed.

2. An electromagnetic device, comprising a retentive magnetic circuit having a field structure and an armature biased away from said structure, said retentive magnetic circuit being capable of holding said armature picked up against the armature bias, three coils disposed on said structure and connected in series with one another, said three coils having substantially equal conductivity values and substantially equal numbers of turns, two adjacent ones of said coils being wound to be cumulative with respect to each other, two valve means series-connected to each other across said two coils to form a closed circuit together therewith, said two valve means having the same polarity of connection relative to said closed circuit, two terminals for supplying alternating current, a normally open start contact, a normally closed interlock contact and a normally open interlock contact both controlled by said armature, one of said terminals being connected to a point of said closed circuit between said two valve means and said other terminal being connected to a point of said closed circuit between said two coils, said normally closed interlock contact and said start contact being disposed in series with said closed circuit between said two terminals so that, when said start contact is closed, said two coils are alternately excited through said respective valve means to temporarily produce pickup fluxes of the same directions in said magnetic circuit, a normally open stop contact, said one coil having its free end connected in series with said normally open interlock contact and in series with said stop contact to said other terminal so that all three coils together cause demagnetization of said magnetic circuit by resultant alternating flux for releasing said armature from picked-up position when said stop contact is closed.

OWEN L. TAYLOR.

REFERENCES CITED

The following references are of record in the file of this patent:

UNITED STATES PATENTS

| Number | Name | Date |
| --- | --- | --- |
| 2,360,954 | Logan | Oct. 24, 1944 |
| 1,301,412 | Elmen | Apr. 22, 1919 |
| 2,260,810 | Jones | Oct. 28, 1941 |
| 2,331,697 | Juchter | Oct. 12, 1943 |

FOREIGN PATENTS

| Number | Country | Date |
| --- | --- | --- |
| 751,634 | France | Sept. 7, 1933 |